(No Model.)

J. HOBBS.
APPARATUS FOR TREATING ARTIFICIAL BUTTER, &c.

No. 271,242. Patented Jan. 30, 1883.

Attest
Wm. H. Sonneborn.
John M. O'Brien

Inventor
John Hobbs
By his atty.
John R. Bennett

UNITED STATES PATENT OFFICE.

JOHN HOBBS, OF BOSTON, MASSACHUSETTS.

APPARATUS FOR TREATING ARTIFICIAL BUTTER, &c.

SPECIFICATION forming part of Letters Patent No. 271,242, dated January 30, 1883.

Application filed December 12, 1882. (No model.)

*To all whom it may concern:*

Be it known that I, JOHN HOBBS, of the city of Boston, in the county of Suffolk and State of Massachusetts, have invented an Improvement in Apparatus for Treating Artificial Butter and for other Purposes, of which the following is a specification.

My invention has reference especially to an apparatus for churning artificial butter, and relates to churns having vertical central churning-shafts; and it consists of a cylindrical vessel having projections secured upon its inner surface, and provided with a vertical central rotating shaft provided with a series of paddles or beaters made flat and set at an angle, so that one paddle tends to force the emulsion or cream down, while the next paddle tends to force it upward in a contrary direction, and at the same time all of the paddles churn the liquid against the stationary projections upon the inner face of the churn-cylinder, and in details of construction, all of which are fully set forth in the following specification and shown in the accompanying drawings, which form part thereof.

Figure 1:
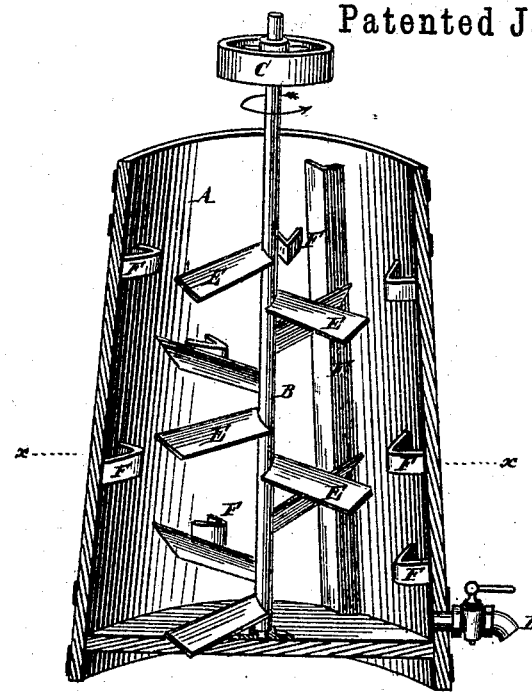
Figure 2:
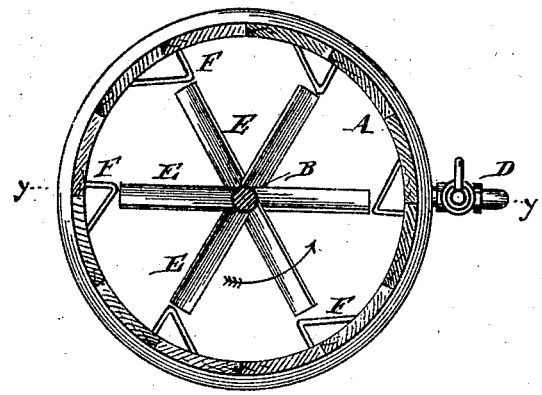

In the drawings, Figure 1 is a vertical sectional perspective view of my improved churn, the section being taken on the line Y Y of Fig. 2; and Fig. 2 is a cross-section of my improved churn on line X X of Fig. 1.

A is the churn-cylinder, which may be slightly conical, if desired, and is open at the top. The bottom of this cylinder is provided with a discharge top or valve D, and the inner face of the churn-cylinder is provided with projections F, in which their sides facing the advancing paddles E radiate from the center of the churn-cylinder; but the remaining sides are set at an angle to such radiating lines, as is clearly shown in Fig. 2. Any other form of projection may be used, if desired, and in practice I prefer to place these projections, when short, in the same horizontal planes with the paddles.

B is the vertical churning-shaft, and is supported centrally in the churn-cylinder, and has a band-wheel, C, upon its upper end, wherewith to rotate said shaft. If desired, the lower end of said shaft may project through the bottom of the churn, and be provided with suitable means whereby it may be rotated.

E are the paddles or beaters, and are made flat, substantially as shown, and set oblique, each successive paddle being set with its obliquity in an opposite direction. Each of these paddles may successively have an opposite obliquity; or those directly above each other may have opposite obliquities; or any other arrangement may be made so long as the paddles jointly act upon the emulsion or cream to force it up, and also down, and at the same time around against the projections F.

Having now described my invention, what I claim as new, and desire to secure by Letters Patent, is—

1. A churn consisting of a vertical cylinder provided with a vertical central rotating shaft provided with paddles or beaters made flat, and having their surfaces set obliquely in such a manner that part of them shall force the liquid to be churned upward and part downward, substantially as and for the purpose specified.

2. A churn consisting of a vertical cylinder provided on its inner surface with projections, in combination with a vertical rotating shaft arranged therein, said shaft being furnished with oblique paddles arranged to move in horizontal planes, part of said paddles having one obliquity and part another, whereby the liquid to be churned is moved both up and down, substantially as specified.

3. In a churn, the vertical cylinder A, open at the top and provided on its inner surface with projections F, in combination with shaft B, furnished with oblique paddles E, as shown and described, pulley C, and valve D, substantially as and for the purpose specified.

In witness whereof I have hereunto set my hand.

JOHN HOBBS.

Witnesses:
WM. D. H. DOWSE,
JAS. A. McGEOUGH.